United States Patent
Järvenpää et al.

(10) Patent No.: US 9,088,621 B2
(45) Date of Patent: Jul. 21, 2015

(54) PROVIDING A PRESENCE SERVICE IN A COMMUNICATIONS SYSTEM

(75) Inventors: Marko Järvenpää, Hyvinkää (FI); Frans Tuomela, Helsinki (FI); Tomi Kinnari, Helsinki (FI)

(73) Assignee: TeliaSonera AB, Stockholm (SE)

( * ) Notice: Subject to any disclaimer, the term of this patent is extended or adjusted under 35 U.S.C. 154(b) by 581 days.

(21) Appl. No.: 12/932,190

(22) Filed: Feb. 18, 2011

(65) Prior Publication Data
US 2011/0231544 A1 Sep. 22, 2011

(30) Foreign Application Priority Data

Mar. 22, 2010 (EP) ..................................... 10157173

(51) Int. Cl.
*G06F 15/173* (2006.01)
*H04L 29/08* (2006.01)

(52) U.S. Cl.
CPC ....................................... *H04L 67/24* (2013.01)

(58) Field of Classification Search
CPC .... H04L 29/08072; H04L 29/06; H04L 43/00
USPC ......................................................... 709/224
See application file for complete search history.

(56) References Cited

U.S. PATENT DOCUMENTS

| | | | | |
|---|---|---|---|---|
| 2003/0101247 A1* | 5/2003 | Kumbalimutt et al. | ....... | 709/221 |
| 2004/0267965 A1* | 12/2004 | Vasudevan et al. | ............ | 709/250 |
| 2005/0210113 A1* | 9/2005 | Kasuga et al. | ................ | 709/206 |
| 2006/0215633 A1* | 9/2006 | Jennings et al. | ............... | 370/352 |
| 2007/0233850 A1* | 10/2007 | Szeto | ............................. | 709/224 |
| 2007/0233852 A1* | 10/2007 | Jachner | ......................... | 709/224 |
| 2008/0162637 A1* | 7/2008 | Adamczyk et al. | ........... | 709/204 |
| 2008/0183866 A1* | 7/2008 | Maeda et al. | ................. | 709/224 |
| 2008/0313329 A1* | 12/2008 | Wang et al. | ................... | 709/224 |
| 2009/0112996 A1* | 4/2009 | Baker et al. | ................... | 709/206 |
| 2009/0264097 A1* | 10/2009 | Cai et al. | ........................ | 455/406 |
| 2009/0319655 A1* | 12/2009 | Viamonte Sole | ............. | 709/224 |
| 2010/0030889 A1* | 2/2010 | Fuchs et al. | .................... | 709/224 |
| 2010/0043020 A1* | 2/2010 | Basso et al. | ....................... | 725/1 |
| 2010/0056196 A1* | 3/2010 | Khan et al. | .................... | 455/518 |
| 2010/0169424 A1* | 7/2010 | Gustafsson et al. | .......... | 709/206 |
| 2010/0332647 A1* | 12/2010 | Agulnik et al. | ............... | 709/224 |

FOREIGN PATENT DOCUMENTS

EP 1 699 218 A1 9/2006

OTHER PUBLICATIONS

GSM: "Rich Communication Suite Release 3, Service Definition" (Online) Feb. 25, 2010 XP002598485 Retrieved from the Internet: URL:http://gsmworld.com/documents/ServiceDefinition_v1.0(1).pdf> (retrieved on Aug. 26, 2010.

* cited by examiner

*Primary Examiner* — Razu Miah
(74) *Attorney, Agent, or Firm* — Cozen O'Connor (57) ABSTRACT

A method in which, in response to receiving, in a first user terminal, presence status information on a second user terminal and a corresponding presence status information identifier, the presence status information and a related command element is displayed on the first user terminal. In response to recognizing an act performed by the user of the first user terminal, where the act includes the user entering a presence comment via the command element, the presence comment and the presence status information identifier are transmitted from the first user terminal to a network apparatus.

18 Claims, 4 Drawing Sheets

PROVIDING A PRESENCE SERVICE IN A COMMUNICATIONS SYSTEM

BACKGROUND OF THE INVENTION

1. Field of the Invention

The exemplary and non-limiting embodiments of the invention relate generally to communication systems and more specifically to providing a presence service to a user terminal.

2. Description of the Related Art

The following description of background art may include insights, discoveries, understandings or disclosures, or associations together with disclosures not known to the relevant prior art to the present invention but provided by the present invention. Some such contributions of the invention may be specifically pointed out below, whereas other such contributions of the invention will be apparent from their context.

A rich communication suite (RCS) initiative is an effort of a group of telecommunications operators and vendors to enhance the adoption of enhanced mobile applications and services, providing an interoperable, convergent, rich communication experience. A presence service is a part of multimedia services, showing the user's availability and/or willingness for communication. A rich communication suite document (i.e. a presence document) may be used for presence exchange.

However, presence has evolved quite a lot recently and may contain a plenty of information on the user, other than just the availability/willingness of the user.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

According to an aspect of the present invention there is provided a method, wherein in response to receiving, in a first user terminal, presence status information on a second user terminal and a corresponding presence status information identifier, the method comprises displaying on the first user terminal said presence status information and a related command element, wherein in response to recognising an act performed by the user of the first user terminal, said act comprising the user entering a presence comment by means of said command element, the method comprises transmitting said presence comment and said presence status information identifier from the first user terminal to a network apparatus.

According to another aspect of the present invention there is provided a communications system, wherein in response to receiving, in the first user terminal, presence status information on the second user terminal and a corresponding presence status information identifier, the system is configured to display, on the first user terminal, said presence status information and a related command element, wherein, in response to recognising an act performed by the user of the first user terminal, said act comprising the user entering a presence comment by means of said command element, the system is configured to transmit said presence comment and said presence status information identifier from the first user terminal to a network apparatus.

According to yet another aspect of the present invention there is provided an apparatus, wherein in response to receiving presence status information on the second user terminal, the apparatus is configured to create a corresponding presence status information identifier, transmit said presence status information and said presence status information identifier to the first user terminal, and receive, from the first user terminal, said presence status information identifier and a respective presence comment entered by the user of the first user terminal so that the presence status information and the respective presence comment are linkable to each other by means of the corresponding presence status information identifier.

According to yet another aspect of the present invention there is provided a first user terminal, wherein in response to receiving presence status information on the second user terminal and a corresponding presence status information identifier, the first user terminal is configured to display said presence status information and a related command element, wherein, in response to recognising an act performed by the user of the first user terminal, said act comprising the user entering a presence comment by means of said command element, the first user terminal is configured to transmit said presence comment and said presence status information identifier to a network apparatus.

According to an aspect of the present invention there is provided a computer program comprising program code means adapted to perform any of steps of a method when the program is run on a processor, the method comprising in response to receiving, in a first user terminal, presence status information on a second user terminal and a corresponding presence status information identifier, displaying on the first user terminal said presence status information and a related command element, wherein in response to recognising an act performed by the user of the first user terminal, said act comprising the user entering a presence comment by means of said command element, the method comprises transmitting said presence comment and said presence status information identifier from the first user terminal to a network apparatus.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

IP multimedia subsystem (IMS) refers to a communications network subsystem providing IP multimedia services that complement the services provided by a circuit switched core network (CS CN) domain. IMS enables PLMN operators to offer their subscribers multimedia services based on and built upon Internet applications, services and protocols.

The rich communication suite (RCS) uses IMS (IP multimedia subsystem) for providing mobile phone communication services. Rich communication enables the use of more than just voice communication. From the end-user point of view, RCS enables communication such as instant messaging, video sharing and/or buddy lists. These capabilities may be available on any type of user devices using open communication between devices and networks. RCS may involve features such as an enhanced phonebook with service capabilities and presence enhanced contacts information, enhanced messaging which enables a large variety of messaging options including chat and messaging history, enriched call which enables multimedia content sharing during a voice call, and/or a "see what I see" capability. Wider and large scale IMS deployment, interoperability between different terminal vendor RCS clients, and RCS service interworking between operators are a part of RCS initiative. RCS leverages existing standards, taking on board different services defined by e.g. 3GPP and OMA and combines them with the enhanced phonebook. This allows the service capabilities as well as presence information of the different recipients to be shown in a terminal phonebook application. RCS reuses the capabilities of a 3GPP-specified IMS core system as an underlying service platform taking care of issues such as authentication, authorization, registration, charging and routing. Following services may be included in the RCS concept: presence, voice call, IM (instant messaging), video share, image share, SMS (short message service), MMS (multimedia messaging service). Some of the capabilities of RCS are also available from Internet service providers. Therefore, the present solution is not limited to the rich communication environment. Instead the present solution is applicable in any type of enhanced communication system. For example, the multimedia messaging service refers to a messaging service for sending and receiving multimedia messages. MMS combines conventional text messages with other ("richer") content types, such as photographs, images, voice clips, and video clips. MMS is used with multimedia terminals, e.g. WAP (wireless application protocol) clients, which are able to receive and process multimedia messages.

A presence service/enabler represents an integral part of many multimedia services, basically showing the user's availability and/or willingness for communication. The rich communication suite (RCS) is one example of a service utilizing presence. Presence has evolved quite a lot recently and may contain a plenty of information on the user, other than just the availability/willingness of the user.

Presence services specified by OMA and RCS (based on IMS) define a status text/note field that a user of a user terminal may use to type in free text that describes his/her feeling, mood or current event like "in lunch" or "opening a wine bottle to celebrate my birthday". In addition, the user may have a status picture/icon in the presence information. An exemplary embodiment of the present solution defines a way for the friends to comment for the status text and the picture, and tie the comment to a presence status change in the IMS system. In an exemplary embodiment, it is also possible for the operator to charge for the comments, as comments may be seen as chargeable messages like SMS. When a user of a user terminal changes a presence status text or a presence status picture, a comment button or the like may appear on the display of the user's friend's terminal. When the user's friend presses the button with his/her user equipment, a dialog (or the like) with a text field may be opened for the friend to write down his/her comment. The friend may then write down a comment, and the written comment is then shared by the user and his/her friends and shown in a user interface, e.g. in a comments dialog.

An exemplary embodiment of the present solution describes a way how the commenting feature may be technically implemented in the IMS system by utilizing an existing network and server. An exemplary embodiment enables defining how a commenting system may be implemented in existing IMS systems, by extending the functionality in the servers and clients and by leveraging the protocols used between the servers and the user devices. In order to realize the commenting system, an exemplary embodiment defines a mechanism in the network for tying the status text and/or the status picture to a comment or to a list of comments. In addition, an exemplary embodiment discloses a function for maintaining the comment and/or the list of comments. The function may also handle the authorization of the comments meaning that only user's friends are able to read and write comments. In an exemplary embodiment the comment itself may also be a chargeable message.

Exemplary embodiments of the present solution will now be described more fully hereinafter with reference to the accompanying drawings, in which some, but not all embodiments of the solution are shown. Indeed, the solution may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present solution is applicable to any user terminal, server, corresponding component, and/or to any communication system or any combination of different communication systems that support services utilizing presence. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using as an example of a system architecture whereto the embodiments may be applied, an architecture based on an evolved UMTS terrestrial radio access network of an enhanced cellular network (E-UTRAN). Although E-UTRAN is discussed as a primary example herein, the present solution is not limited to E-UTRAN, LTE, and/or 3GPP systems. Thus, the present solution may also be applicable to other communications systems such as WiMAX (worldwide interoperability for microwave access), HSDPA (high-speed downlink packet access), HSUPA (high-speed uplink packet access), and/or WLAN (wireless local area network).

Figure 1:
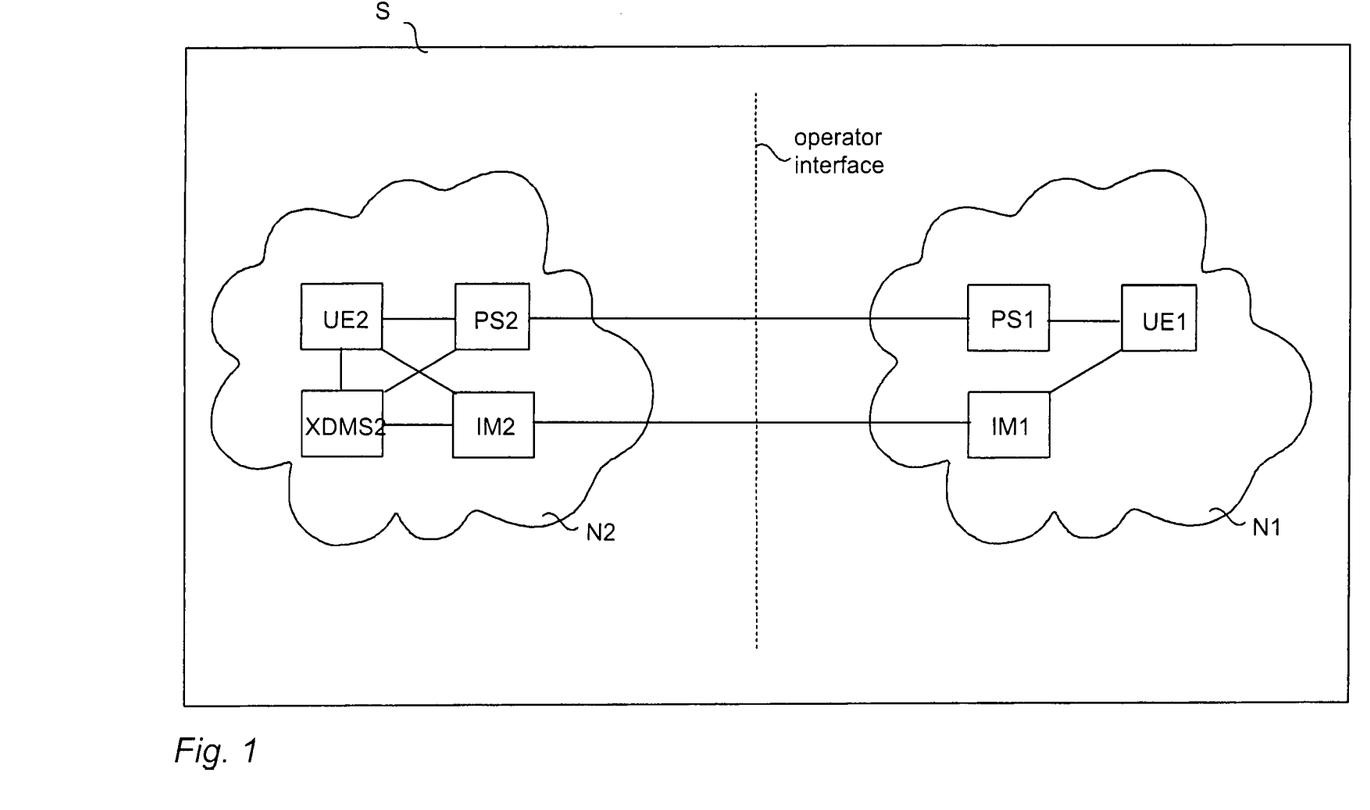
FIG. 1 is illustrates a communications system according to an exemplary embodiment.

A general architecture of a communication system according to exemplary embodiments of the present solution is illustrated in FIG. 1. FIG. 1 is a simplified system architectures only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for a presence service, are irrelevant to the actual invention. Therefore, they need not to be discussed in more detail here.

FIG. 1 provides an example of an environment where the present solution may be used. Referring to FIG. 1, a communications system S according to an exemplary embodiment of the present solution comprises a user equipment UE1, UE2 that may be e.g. a mobile or wireless user terminal, such as a mobile phone (mobile station), a personal digital assistant (PDA), a game console, a smart phone, a personal computer (PC), a laptop, a desktop computer or the like, capable of providing presence data. The system S further comprises a core network element PS1, PS2, such as a presence server or any other core network element capable of handling presence data. The first presence server PS1 of a first operator network N1 is operatively connected to the second presence server PS2 of a second operator network N2. A first messaging server IM1, in this case to an instant messaging server IM1, located in N1, is operatively connected to an IM server IM2, located in N2. IM2 is operatively connected to an XML document management system XDMS2 located in N1. In the example shown in FIG. 1, the first user terminal UE1 ("watcher") belongs to a first user ("user A") and is capable of connecting to the first operator network N1, and the second user terminal UE2 belongs to a second user ("user B") and is capable of connecting to the second operator network N2. UE1 and UE2 are able to communicate to each other via one more network nodes PS1, PS2, IM1, IM2, XDMS2.

FIG. 1 shows a simplified version of an evolved UMTS (universal mobile telecommunications system) terrestrial radio access network structure, which only illustrates the components that are essential to illustrate the present solution, even though those skilled in the art naturally know that a general communications system also comprises other functions and structures, which do not have to be described in more detail herein. The network element PS1, PS2, IM1, IM2, XDMS2 may include any network element operated by a network operator in a cellular, wireless and/or fixed network, such as a mobile switching centre, SGSN, GGSN, VLR, HLR, HSS, base station, access point, radio network controller, database, and/or a network computer or server. Although each network element UE1, UE2, PS1, PS2, IM1, IM2, XDMS2, N1, N2 has been depicted as one entity, different modules and memory may be implemented in one or more physical or logical entities. A general architecture of a communication system providing presence-based communication is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for session-based communication are irrelevant to the actual invention. Therefore, they need not be discussed in more detail here.

Figure 2:
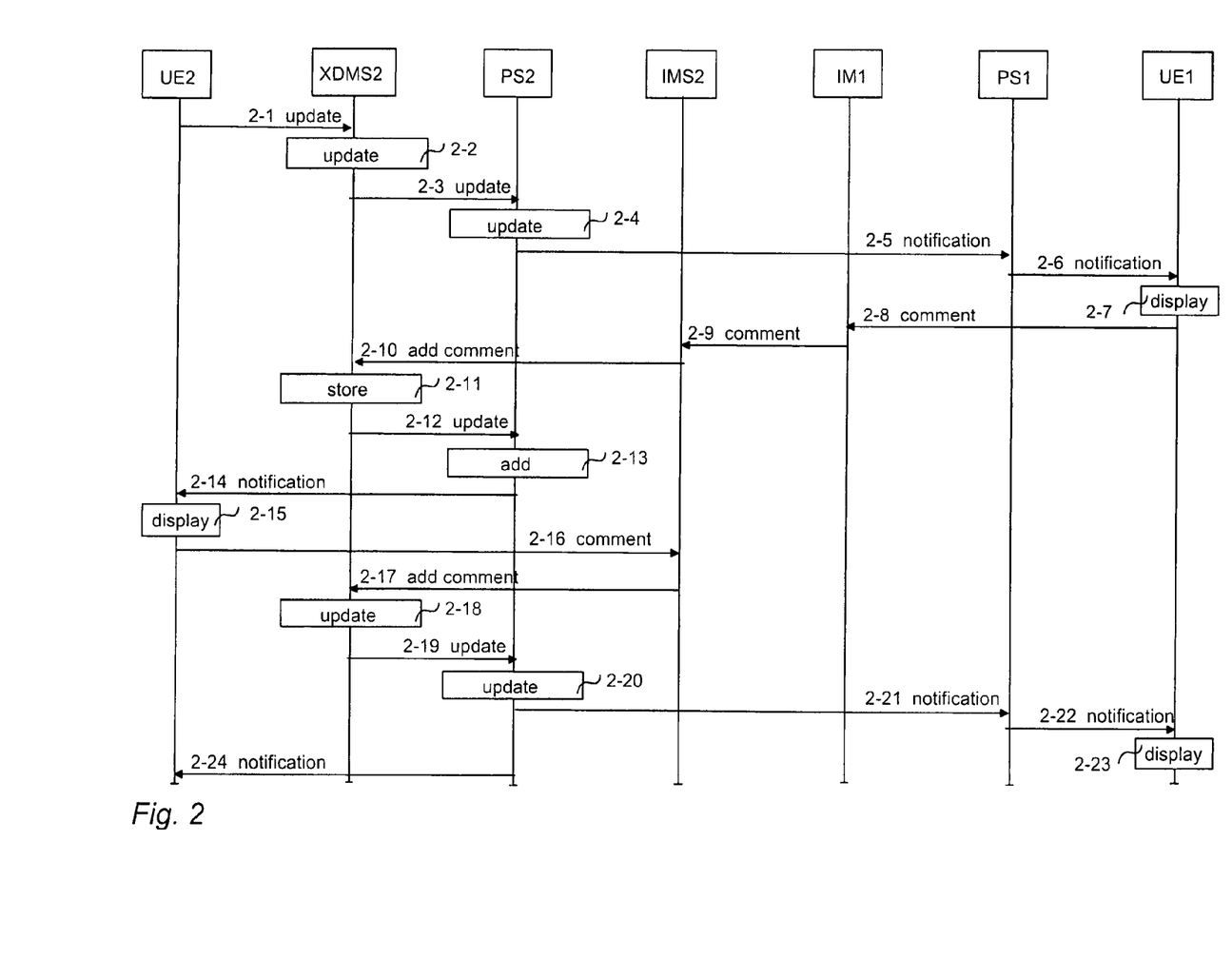
FIG. 2 illustrates signalling according to an exemplary embodiment.

FIG. 2 illustrates signalling between network elements according to an exemplary embodiment of the present solution. FIG. 2 depicts the signalling how the present solution may be implemented in the IP multimedia subsystem IMS. FIG. 2 illustrates how the second user ("user B") may update his/her presence information. Referring to FIG. 2, UE2 updates the presence of user B by transmitting a PUT message 2-1 to XDMS2. The presence server PS2 receives 2-4 information 2-3 on the update from XDMS2, and updates 2-4 user B's presence based on the update 2-2 carried out in XDMS2, and notifies user B's friends (e.g. the user of the first user terminal UE1, i.e. "user A") about the presence update by transmitting, to the presence server PS1, a notification 2-5 including information on the presence status of UE2 as well as a corresponding presence status identifier. The presence status information identifier may comprise e.g. a timestamp of the presence status information, identifying the time when the presence status information of the second user terminal UE2 was changed (i.e. when the identifier was created 2-2 in XDMS2; another option is that PS2 or UE2 creates the identifier). The notification may be forwarded 2-6 from PS1 to UE1, wherein the presence status information and a related command element may be displayed 2-7 on the display of the first user terminal UE1. Thus user A is able to see user B's presence change in user A's user equipment and may decide to comment the note/picture included in the presence status information. The command element may comprise e.g. a virtual command button and/or command prompt enabling the user of the first user terminal UE1 to select a predefined presence comment and/or to write a free-text presence comment. The comment as well as the corresponding presence status identifier 2-8 are then sent to a messaging server IM1, in this case to an instant messaging server IM1 in N1 (i.e. to the IM server in the originating side). IM1 is connected to an IM server IM2 in N2 (i.e. to the IM server in the terminating side). Thus IM1 transmits 2-8 the comment and the identifier to IM2. The IM server IM2 in the terminating side is connected to XDMS2 (also in the terminating side) and updates user B's presence information by adding 2-10 the comment (and the identifier) in user B's presence document in XDMS2.

As disclosed above, the presence comment may be tied to a particular status text or icon. This may be done, for example, by including a timestamp in the note or icon and then referring to the note or icon in the message with the same timestamp. The following illustrates an imaginary presence document of a presentity that contains a note with a text "Summer!" and a timestamp that tells the date/time when the note was set.

```
<presence>
    <person>
        <note>
                Summer!
                <timestamp>2009-06-01T12:10:29Z</timestamp>
                <comments/>
        </note>
    </person>
</presence>
```

The empty comments element tells the watcher ("user A") that the watcher is able to comment on the presentity's status and may be put as a part of the presence publish (i.e. PUT to XDMS2).

When the watcher wants to comment the picture the watcher's user equipment creates e.g. a SIP message that contains a comment:

```
MESSAGE sip:12345678@domain SIP/2.0
Max-Forwards: 70
From: sip:12345678@domain;tag=49583
To: sip:23456789@someotherdomain
Accept-Contact: *;+presence_comment;require;explicit
```

-continued

```
Event: presence.comment
Call-ID: asd88asd77a@1.2.3.4
CSeq: 1 MESSAGE
Content-Type: text/plain
Content-Length: 10
Yes it is!
```

In the message, the event header describes that the message is a presence comment, with a value "presence.comment". The timestamp may e.g. be a part of the SIP header or the actual message.

<timestamp>2009-06-01T12:10:29 Z</timestamp>Yes it is!

The comment 2-8 is then sent from the user terminal UE1 to the originating IM server IM1 from where the originating IM server forwards 2-9 the comment to the terminating IM server. The terminating IM server IM2 then notices that the message is a comment (according to the event header field) to a presence status text or icon, and connects 2-10 to'XDMS2. The user's status text or the link to the picture is stored 2-11 in XDMS2. When the presence server PS2 publishes user B's presence information the presence server PS2 fetches 2-12 the information from XDMS2 and adds 2-13 the information to the presence document published by the presence server PS2.

The messaging server PS2 may first check 2-13 from a presentity's authorization list that the sender of the comment really is a friend of the presentity. Then the messaging server PS2 checks 2-13 whether there is a note element the timestamp of which matches the timestamp that comes with the comment. If they match, the messaging server adds 2-13 the comment to the note element:

```
<presence>
    <person>
<note>
        Summer!
            <timestamp>2009-06-01T12:10:29Z</timestamp>
            <comments>
                <comment from="sip:12345678@domain">
                    Yes it is!
                    <timestamp>2009-06-01T12:15:29Z</timestamp>
                </comment>
            </comments>
        </note>
    </person>
</presence>
```

Another option for implementing this is to store the comments in a content XDMS2 in a separate document and add a link that points to the list in the content XDMS2 into the note element.

Thus the presence status information and the related presence comment may be stored 2-11, 2-13 in XDMS2 and/or PS2 so that they are linked to each other on the basis of the corresponding presence status information identifier (so that the presence status information and the comment related to the presence status information can be identified on the basis of the presence status information identifier). The presence comment may be provided to the second user terminal UE2 by transmitting a notification 2-14 to the second user terminal UE2. Then the presence comment and a related command element may be displayed 2-15 on the display of the second user terminal UE2. Thus user B is able to see user A's presence comment in user B's user equipment and may further decide to comment the note/picture included in user A's presence comment. The command element may comprise e.g. a virtual command button and/or command prompt enabling the user of the second user terminal UE2 to select a predefined presence comment and/or to write a free-text presence comment. User B's comment as well as the corresponding presence status identifier 2-16 (the identifier corresponds to the identifier sent by UE1 in message 2-8) are then sent 2-16 to the messaging server IM2, in this case to the instant messaging server IM2 in N2. IM2 updates user B's presence information by adding 2-17 the comment (and the identifier) in user B's presence document in XDMS2. The presence server PS2 receives 2-20 information on the update from XDMS2, and updates 2-20 user B's presence based on the update 2-18 carried out in XDMS2, and notifies user B's friends (e.g. the user of the first user terminal UE1, i.e. "user A") about the presence update (i.e. user B's comment) by transmitting, to the presence server PS1, a notification 2-21 including information on user B's comment as well as the corresponding presence status identifier. The notification may be forwarded 2-22 from PS1 to UE1, wherein the presence status information and a related command element may be displayed 2-23 on the display of the first user terminal UE1. Thus user A is able to see user B's presence comment in user A's user equipment. Information on the updated presence document of UE2 may be provided to UE2 by transmitting a notification 2-24 from PS2 to UE2.

Figure 3:
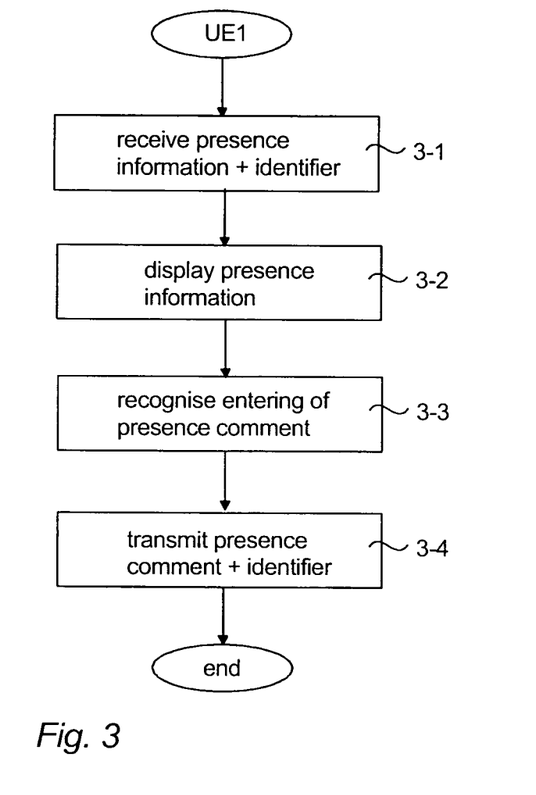
FIG. 3 is a flow chart illustrating the operation of a user terminal according to an exemplary embodiment.

FIG. 3 illustrates the operation of a terminal apparatus UE1 according to an exemplary embodiment of the present solution. Referring to FIG. 3, in response to receiving 3-1, from a network apparatus IM2, XDMS2, PS2, PS1, presence status information on a second user terminal UE2 and a corresponding presence status information identifier, UE1 is configured to display 3-2 the presence status information and a related command element. In response to recognising 3-3 an act performed by the user of UE1, the act comprising the user entering a presence comment by means of the command element, UE1 is configured to transmit the presence comment and the presence status information identifier to the network apparatus IM2, XDMS2, PS2.

Figure 4:
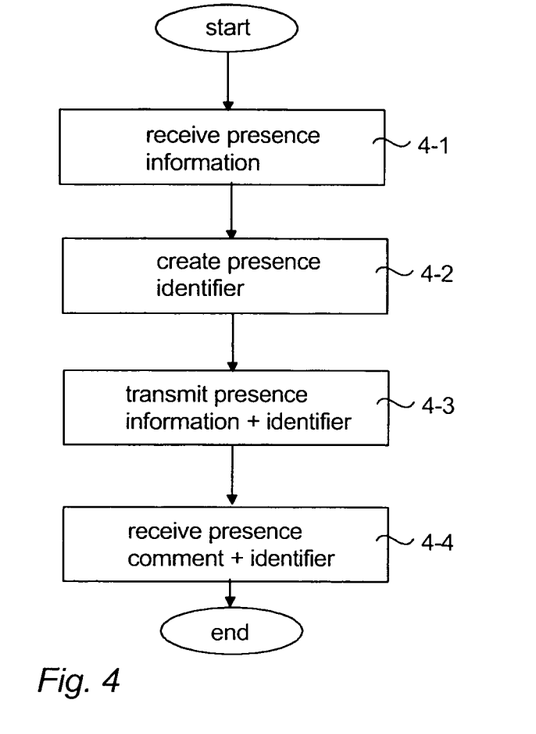
FIG. 4 is a flow chart illustrating the operation of an apparatus according to an exemplary embodiment.

FIG. 4 illustrates the operation of a network apparatus according to an exemplary embodiment of the present solution. Referring to FIG. 4, in response to receiving 4-1 presence status information on a second user terminal UE2, the apparatus is configured to create 4-2 a corresponding presence status information identifier, transmit 4-3 the presence status information and said presence status information identifier to UE1, and receive 4-4, from UE1, the presence status information identifier and a respective presence comment entered by the user of UE1, so that the presence status information and the respective presence comment are linkable to each other by means of the corresponding presence status information identifier.

The steps/points, signaling messages and related functions described above in FIGS. 1 to 4 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point. The operations to be executed illustrate a procedure that may be implemented in one or more physical or logical entities. The signaling messages are only exemplary and may even comprise several separate messages for transmitting the same information. In addition, the messages may also contain other information.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User terminal (user equipment) may refer to any user communication device. A term "user equipment" as used herein may refer to any device having a communication capability, such as a wireless mobile terminal, a PDA, a smart phone, a personal computer (PC), a laptop computer, a desktop computer, etc. For example, the wireless communication terminal may be an UMTS or GSM/EDGE smart mobile terminal. Thus, the application capabilities of the device according to various embodiments of the invention may include native applications available in the terminal, or subsequently installed applications. The network apparatus may be implemented in any network element, such as a server.

An apparatus capable of performing operation according to various embodiments of the present solution may refer to any communication entity, such as the network apparatus, database or the user terminal. The apparatus may generally include a processor, controller, or the like connected to or comprising a memory. The memory may include volatile and/or non-volatile memory and typically stores content, data, or the like. For example, the memory may store computer program code such as software applications or operating systems, information, data, content, or the like for a processor to perform steps associated with operation of the entity in accordance with embodiments of the present invention. Also, for example, the memory typically stores content transmitted from, or received by, the apparatus. Memory may be, for example, random access memory (RAM), a hard drive, or other fixed data memory or storage device. The processor may receive input from an input device and may display information on a display. The processor may also be connected to at least one communication interface or other means for transmitting and/or receiving data, content, messages, or the like. Where the apparatus provides wireless communication, such as in a UMTS, GSM, EDGE, WCDMA network, Bluetooth network, a wireless LAN network, or other mobile network, the processor may operate with a wireless communication subsystem of the interface. Where the apparatus provides an IP server with IP communication, the processor may operate with an IP communication system of the interface. One or more processors, memory, storage devices, and other computer elements may be used in common by a computer system and subsystems, as part of the same platform, or processors may be distributed between a computer system and subsystems, as parts of multiple platforms. If the apparatus is, for example, a mobile station or a network server, the apparatus may also include modules such as a messaging service client/server and/or an application associated with the processor. These modules may be software and/or software-hardware components. For example, a messaging service client/server may include software capable of establishing, modifying, and terminating messaging sessions, to send and receive messages, etc. The apparatus may generally include a processor, controller, control unit or the like connected to a memory and to various interfaces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment. An interface provides a transmitter and/or a receiver or a corresponding means for receiving and/or transmitting data, content, messages including the above described advertisements, responses and solicitation messages.

At least some embodiments or aspects described herein may be implemented using programming stored within an appropriate storage circuitry described above or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet or a private network), wired electrical connection, optical connection or electromagnetic energy, for example, via communications interface, or provided using other appropriate communication structure or medium. Exemplary programming including processor-usable code may be communicated as a data signal embodied in a carrier wave in but one example.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

RCS—Rich communication suite,
OMA—Open mobile alliance,
CAB—Converged address book,
NAB—Network address book,
XDMS—XML document management system,
IM—Instant messaging,
IMS—IP multimedia subsystem,
SMS—Short message service,
3GPP—Third generation partnership project,
PLMN—Public land mobile network,
XML—Extensible markup language,
IP—Internet protocol.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of providing a presence service in a communications system comprising a first user terminal configured to receive presence status information on a second user terminal, the method comprising:
   displaying, on the first user terminal, presence status information on the second user terminal and a related command element in response to receiving, in the first user terminal from a network apparatus, said presence status information on the second user terminal and a corresponding presence status information identifier;
   transmitting a presence comment and said presence status information identifier from the first user terminal to said network apparatus in response to recognizing an act performed by a user of the first user terminal, said act comprising the user entering said presence comment via said command element;
   checking, in said network apparatus, from a presentity authorization list to determine whether the sender of said presence comment is a friend of the presentity;
   if the sender of said presence comment is determined to be a friend of the presentity, checking, in said network apparatus, to determine whether there is a note element having a timestamp that matches the timestamp of said presence comment; and
   if it is determined that there is a note element having a matching timestamp, adding, in said network apparatus, said presence comment to said note element.

2. The method according to claim 1, further comprising:
   storing, in the network apparatus, the presence status information and the presence comment so that they are linked to each other based on the corresponding presence status information identifier.

3. The method according to claim 1, further comprising:
   providing the presence comment to the second user terminal; and
   displaying the presence comment on the second user terminal.

4. The method according to claim 1, further comprising:
   displaying the related command element on the first user terminal in response to a change in the presence status information of the second user terminal.

5. The method as claimed in claim 1, further comprising:
   recognizing, in the network apparatus, a change in the presence status of the second terminal; and
   providing the presence status information on the second user terminal and the corresponding presence status information identifier to the first user terminal based on the recognition.

6. The method as claimed in claim 1, further comprising:
   charging the user of the first user terminal for the transmission of the presence comment.

7. The method as claimed in claim 1, wherein the presence status information comprises a presence note provided by the second user terminal, the presence note being entered by a user of the second user terminal.

8. The method as claimed in claim 1, wherein the presence status information identifier comprises a timestamp of the presence status information, the timestamp identifying a time when the presence status information of the second user terminal was changed.

9. The method as claimed in claim 1, wherein the command element comprises at least one of a virtual command button and command prompt for enabling the user of the first user terminal to at least one of select a predefined presence comment and to write a free-text presence comment.

10. A communications system comprising:
    a first user terminal configured to receive presence status information on a second user terminal;
    wherein the system is configured to:
      display, on the first user terminal, said presence status information on the second user terminal and a related command element in response to receiving, in the first user terminal from a network apparatus, said presence status information on the second user terminal and a corresponding presence status information identifier;
      transmit a presence comment and said presence status information identifier from the first user terminal to said network apparatus in response to recognizing an act performed by a user of the first user terminal, said act comprising the user entering said presence comment via said command element;
      check from a presentity authorization list to determine whether the sender of said presence comment is a friend of the presentity;
      if it is determined that the sender of said presence comment is a friend of the presentity, check to determine whether there is a note element having a timestamp that matches the timestamp of said presence comment; and
      if it is determined that there is a note element having a matching timestamp, add said presence comment to said note element.

11. A network apparatus for a communications system comprising:
    a first user terminal configured to receive presence status information on a second user terminal;
    wherein, in response to receiving presence status information on the second user terminal, the apparatus is configured to:
      create a corresponding presence status information identifier;
      transmit said presence status information and said presence status information identifier to the first user terminal;
      receive, from the first user terminal, said presence status information identifier and a respective presence comment entered by a user of the first user terminal, so that the presence status information and said respective presence comment are linkable to each other via said corresponding presence status information identifier;
      check from a presentity authorization list to determine whether the sender of said respective presence comment is a friend of said presentity;
      if it is determined that the sender of said respective presence comment is a friend of said presentity, check to determine whether there is a note element having a timestamp that matches the timestamp of said respective presence comment; and
      if it is determined that there is a note element having a matching timestamp, add said respective presence comment to said note element.

12. The network apparatus according to claim 11, wherein the network apparatus is further configured to store the presence status information and the presence comment so that they are linked to each other based on the corresponding presence status information identifier.

13. The network apparatus according to claim 11, wherein the network apparatus is configured to provide the presence comment to the second user terminal.

14. The network apparatus according to claim 11, wherein the network apparatus is further configured to recognize a change in the presence status of the second user terminal and, based on the recognition, provide the presence status information on the second user terminal and the corresponding presence status information identifier to the first user terminal.

15. The network apparatus as claimed in claim 11, wherein the network apparatus is further configured to charge the user of the first user terminal for the transmission of the presence comment.

16. The network apparatus as claimed in claim 11, wherein the presence status information comprises a presence note provided by the second user terminal, the presence note being entered by a user of the second user terminal.

17. The network apparatus as claimed in claim 11, wherein the presence status information identifier comprises a timestamp of the presence status information, the timestamp identifying a time when the presence status information of the second user terminal was changed.

18. A computer program product comprising a non-transitory data storage medium having a computer readable program code embedded therein for controlling a data processing apparatus, the computer readable program code being configured to cause the data processing apparatus to execute a process comprising the steps of claim 1.

\* \* \* \* \*